United States Patent [19]

Freeman et al.

[11] Patent Number: 4,655,995

[45] Date of Patent: Apr. 7, 1987

[54] REVERSIBLE BWR FUEL ASSEMBLY AND METHOD OF USING SAME

[75] Inventors: Thomas R. Freeman, New Alexandria; John F. Wilson, Murrysville; Ronald P. Knott, North Huntingdon, all of Pa.

[73] Assignee: Westinghouse Electric Corp., Pittsburgh, Pa.

[21] Appl. No.: 609,252

[22] Filed: May 11, 1984

[51] Int. Cl.⁴ ............................................. G21C 19/00
[52] U.S. Cl. .................................... 376/267; 376/435; 376/445; 376/447; 376/456
[58] Field of Search ............... 376/267, 435, 445, 447, 376/451, 456

[56] References Cited

U.S. PATENT DOCUMENTS

| | | |
|---|---|---|
| 3,350,275 | 10/1967 | Venier et al. |
| 3,466,226 | 9/1969 | Lass. |
| 3,799,839 | 3/1974 | Fischer ................................ 376/435 |
| 3,802,995 | 4/1974 | Fritz et al. |
| 4,119,489 | 10/1978 | Itoh et al. |
| 4,125,433 | 11/1978 | Iljunin ................................ 376/435 |
| 4,280,874 | 7/1981 | Kawai ................................ 376/435 |

FOREIGN PATENT DOCUMENTS 923633 4/1963 United Kingdom ............... 376/267

Primary Examiner—Donald P. Walsh

[57] ABSTRACT

A fuel assembly, particularly advantageous for use with a BWR, wherein the fuel bundle is adapted to be inserted into an envelope formed from a flow channel and a lower nozzle assembly. The fuel bundle is essentially axially symmetrical having identical top and bottom tie plates. Within the fuel bundle, alternate fission gas plenums are disposed at the top and bottom of the bundle respectively.

During the refueling operation, the fuel bundle is removed from the reactor core, axially inverted and reinserted into the core for continued burn up. The invention takes advantage of the reactivity increase possible in a BWR when a partially burned fuel bundle is inverted.

15 Claims, 2 Drawing Figures

REVERSIBLE BWR FUEL ASSEMBLY AND METHOD OF USING SAME

BACKGROUND OF THE INVENTION

1. Field of the Invention

The present invention relates to boiling water reactor (BWR) fuel assemblies and more particularly to a BWR fuel assembly capable of reversible or inverted operation.

2. Description of the Prior Art

The generation of a large amount of heat energy through nuclear fission in a nuclear reactor is well known. This energy is dissipated as heat in elongated nuclear fuel rods. A plurality of nuclear fuel rods are grouped together to form separately removable nuclear fuel assemblies. A number of such nuclear fuel assemblies are typically arranged in a matrix to form a nuclear reactor core capable of a self sustained, nuclear fission reaction. The core is typically submersed in a fluid, such as light water, that serves as a coolant for removing heat from the nuclear fuel rods and as a neutron moderator.

A typical nuclear fuel assembly may be formed by an $8 \times 8$ array of spaced-apart, elongated rods supported between upper and lower tie plates. Examples of such typical nuclear fuel assemblies are depicted in and described in U.S. Pat. Nos. 3,350,275; 3,466,226; 3,802,995. In a typical BWR nuclear fuel assembly having an $8 \times 8$ rod array, the sixty four rods that form the $8 \times 8$ array may be either sixty four fuel rods or may have one or more nonfueled, water moderator rods with the remaining rods being fuel rods.

A common problem in BWR reactors is the high fuel costs associated with the typical BWR fuel cycle. In BWR fuel assemblies, the fuel near the bottom of the fuel assemblies is "burned up" at a faster rate than the fuel near the top of the assembly. This is because in a BWR, the power spectrum is skewed towards the bottom of the fuel assembly. This skewing is a result of the change in void fraction in the fuel assembly from the top to the bottom. Boiling of coolant typically commences about one quarter of the way from the bottom of the fuel assembly. From that point upwards, the void fraction increases to as high as sixty to seventy percent at the top of the fuel assembly. Since the coolant acts as a neutron moderator, thermalizing fast neutrons, the low H/U ratio at the top of the core results in a situation where the top of the core is less reactive than the bottom and therefore generates less power.

In typical BWR reactors, the control rods enter the core from the bottom for the purpose of limiting the skew and power distribution. However, even with control rod insertion, more power is produced and more burn up takes place at the bottom of the core. Thus, the fuel at the lower end of the core, where the water density is high, is more completely burned than the fuel at the top of the core. This results in less than optimum burn up of fuel and overall higher fuel costs.

In copending, commonly assigned U.S. application Ser. No. 609,250 filed currently herewith, an improved (PWR) pressurized water reactor fuel assembly is disclosed having fuel rods with plenum zones for fission gases where some of the fuel rods have plenum zones at the bottom of the rod for the purpose of enhanced fuel utilization and reduced neutron leakage.

In U.K. Pat. No. 923,633 there is disclosed a method of continuously charging a BWR in order to achieve a more uniform burn up of fuel. The method involves dividing the fuel assembly into axial and radial zones of differing mean burn up rate and then continuously transporting the fuel rods from zone to zone according to a complex schedule.

Itoh et al and U.S. Pat. No. 4,119,489 discloses a nuclear fuel assembly design in which the tubular channel members surrounding the fuel assemblies is removably supported by the upper tie plate so that the channel member may be removed, turned upside down, and then reinserted over the fuel assemblies so as to minimize the effects of flow channel deformation. In the asssembly of Itoh et al, the fuel assemblies themselves are not moved nor are they reversible.

Thus, the prior art fails to teach a BWR fuel assembly which is compatible with and which can be substituted for original fuel during refueling operations and which can achieve more complete burn up of the fuel.

SUMMARY OF THE INVENTION

It is therefore, an object of the present invention to provide an improved BWR fuel assembly.

It is a further object of the present invention to provide and improve BWR fuel assembly capable of achieving higher rates of fuel burn up thus lowering overall fuel cycle costs. It is still a further object of the present invention to provide a new and improved method of operating a BWR reactor wherein more complete burn up of fuel is accomplished.

To achieve these other objects of the present invention in accordance with the preferred embodiment of the invention there is provided a nuclear fuel assembly having a flow channel and a lower nozzle assembly structurally attached to the flow channel in order to form an external envelope into which a fuel bundle may be inserted.

According to the present invention, the fuel bundle is configured to be inserted into the envelope in either of two axially reversible orientations. The fuel bundle comprises a plurality of elongated fuel rods held in a spaced lateral array between a top and a bottom tie plate. The top and bottom tie plates are substantially identical and each is supplied with a means for supporting the fuel bundle within the envelope. Preferably, the supporting means are provided with lifting slots to facilitate the removal of the fuel bundle from the fuel assembly and subsequent reinsertion of the inverted fuel assembly.

Advantageously, each fuel bundle will comprise a plurality of fuel rods having tubular cladding containing nuclear fuel and a fission gas plenum disposed within the cladding for accommodating fission gases released during operation of the fuel assembly. A portion, preferably half of the fission gases plenums are disposed adjacent to the top tie plate and the remainder of the fission gas plenums are disposed adjacent to the bottom tie plate. For in assuring axial symmetry, it is preferable that each alternate fission gas plenum be disposed adjacent to top tie plate and the intervening alternate fission gas plenums be disposed adjacent to bottom tie plate.

In accordance with another embodiment of present invention, there is disclosed a method of operating a nuclear reactor comprising inserting a substantially axially symmetrical nuclear fuel bundle into an external envelope from a flow channel to the bottom nozzle assembly and then operating the reactor for a period of time. After operation, the fuel bundle is withdrawn from the envelope and axially inverted. The axially inverted fuel bundle is then reinserted into the envelope after which reactor operation is continued for an additional period of time.

BRIEF DESCRIPTION OF DRAWINGS

The accompanying drawings which are incorporated in and form a part of the specification illustrate the presently preferred embodiment of the invention and, together with the description, served to explain the principles of the invention. In the drawings.

DETAILED DESCRIPTION OF THE INVENTION

Figure 1:
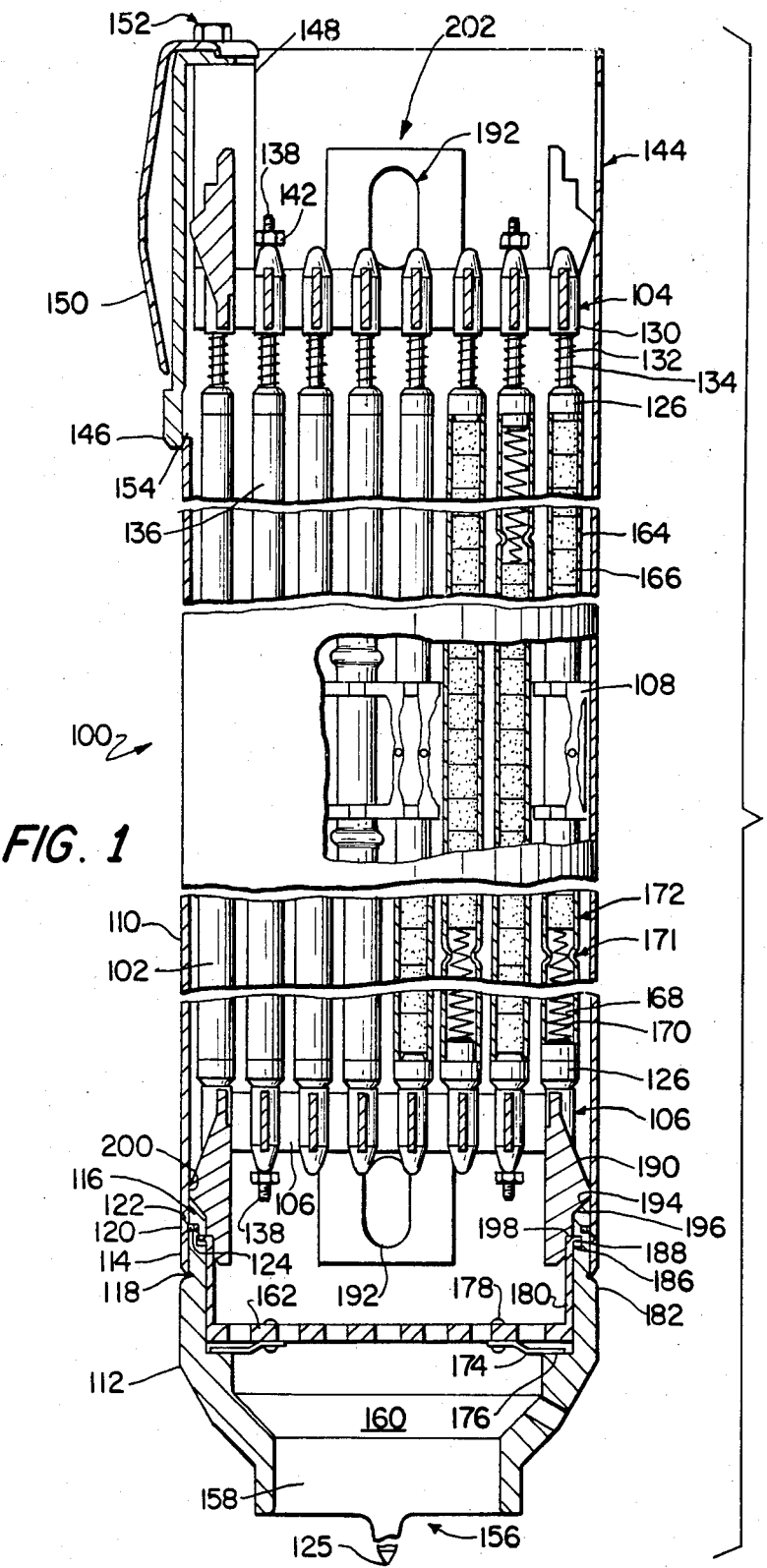
FIG. 1 illustrates a fragmentary elevation, in partial section of a fuel assembly featuring the formation of the external envelope of the fuel assembly and the manner in which the lower nozzle assembly coacted with the upper and lower tie plates.

Reference will now be made in detail to the presently preferred embodiment of the invention, an example of which is illustrated in the accompanying drawings. Turning first to FIG. 1 there is illustrated a fuel assembly 100. The fuel assembly comprises a plurality of elongated fuel rods 102 which are further described below and which are spaced in a lateral array. The fuel rods 102 are disposed between substantially identical top and bottom tie plates 104 and 106 respectively and are retained in lateral array by one or more spacer grids 108. The precise number and configuration of the spacer grids 108 is selected in accordance with the particular thermal, hydraulic, nuclear, and mechanical properties of the fuel assembly 100.

The fuel assembly 100 includes an elongated, flow impervious, outer fow channel 110 that is preferably formed from an alloy of zirconium commonly known as Zircaloy, that extends substantially along the entire length of the fuel assembly 100 and that is structurally connected to a lower nozzle assembly or base 112. Preferably, the base 112 is formed from reactor grade stainless steel.

Preferably, channel 110 is connected to the base 112 by what may be referred to as tongue and groove connection formed by the receipt of a lower end 114 of the flow channel against an axially or vertically extending elongated portion 116 with reduced lateral dimensions that extend about the periphery of the base 112. The lower end 114 of the flow channel 110 also is designed to rest against a laterally or radially outwardly extending shoulder 118 that is formed about the periphery of the base 112. Once in position on the shoulder 118 and against the connecting portion 116, the lower end 114 of the flow channel 110 may be secured to the base 112 by the receipt of the plurality of threaded retaining screws 120 through a plurality of apertures 122 formed in the lower end 114 of the flow channel 110 for threaded engagement with correspondingly elongated threaded apertures 124 formed through the connecting portion 116 of the base 112. Preferably, the screws 120 are counter sunk into the lower end 114 of the flow channel 110 to present a smooth surface thereon. In this manner, each of the four sides of the lower end 114 of the flow channel 110 may be structurally interconnected with the base 112.

As will be understood by the artisan, the base 112 is adapted to be inserted into a core plate hole (not illustrated) in the reactor core. Guide bars 125 may be provided for guiding the fuel assemblies into the core plate holes.

In a preferred embodiment of the invention, each fuel assembly 100 comprises a fuel bundle which includes a plurality of sixty four fuel rods arranged in an 8×8 array. Each of the fuel rods 102 include an end plug 126 at each end thereof.

In accordance with an important feature of the present invention, the top and bottom tie plates 104 and 106 are substantially identical and may be fabricated as a connected series of thin metal bars or strips 128 which are formed by an convenient means such as casting or machining. At each of the fuel rod lattice positions, a small cylinder having cylindrical aperture 130 is formed to receive with a slip fit an elongated vertical extension 132 of the end plug 126 of the fuel rod 102. The slip between the top and bottom tie plates 104 and 106 and the fuel rods 102 provides lateral restraint for the fuel rods but permits relative axial movement therebetween. A plurality of elongated compression springs 134 are disposed over the vertical extensions 132 of upper end plugs 100 and bear against the lower surface of the top tie plate 104 to maintain the fuel rods 102 seated in the lower tie plate 106 and to support the upper tie plate 104.

Preferably, at least one fuel rod in each fuel bundle is a tie rod 136 that is used to interconnect as a unit the upper tie plate 104, the lower tie plate 106, and the plurality of fuel rods 102. Tie rod 136 may include a threaded elongated vertical extension 138 as a portion of its upper and lower end plugs 126. The extension 138 will preferably pass through an aperture 140 in the tie plates 104 and 106 for receipt of a threaded locking or retaining nut 142.

Figure 2:
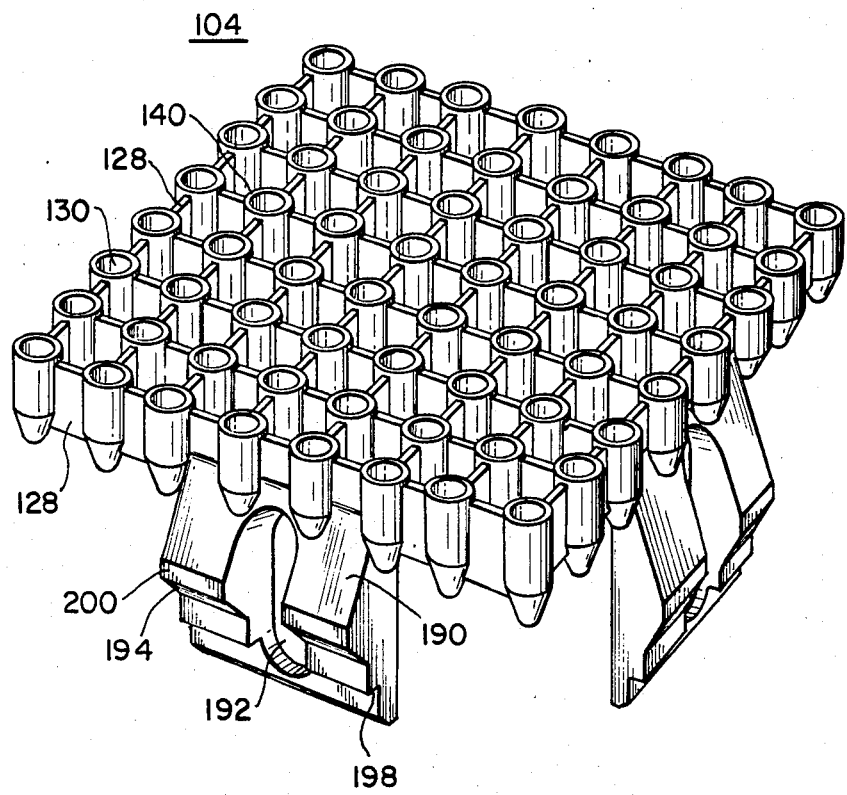
FIG. 2 is a perspective view of a tie plate according to the present invention showing the integral lifting slots thereof.

As best seen in FIG. 2, the tie plates 104 and 106 comprise an egg-crate grid type structure which allows fuel assembly coolant flow to pass therethrough.

In accordance with a further feature of the present invention the flow channel 110 is provided with an integrally formed lifting slot 144 that facilitates handling of the fuel assembly 100.

Turning again to FIG. 1, the fuel assembly 100 is further provided with bumpers 146 for contacting, when necessary, similarly configured bumpers on adjacent fuel assemblies to insure a minimum spacing and fluid gap between adjacent fuel assemblies. In addition, a pillar 148 may be provided for supporting a channel spring assembly 150 and an elongated, threaded, spring assembly retaining bolt 152. The spring assembly 150 may comprise a bi-directional leaf spring which is designed to contact corresponding leaf springs on adjacent fuel assemblies to maintain spacing between adjacent fuel assemblies and to transmit loads from one fuel assembly to another. Reference may be had to U.S. Pat. No. Re 27,173 for details with regard to an exemplary channel spring assembly. In order to accommodate the radially outwardly projecting portions of the bumpers 146 and of the spring assembly 150, the upper end of the flow channel 110 is advantageously provided with a plurality of appropriately configured cutouts 154.

The base 112 includes an inlet nozzle 156 having an inlet opening or aperture 158 for the receipt of coolant core moderator flow. The nozzle 156 may be eccentrically formed during the casting of the base 112 or subsequent thereto by machining the material of the base 112 that forms the nozzle 156 to vary the thickness of the nozzle 156 about its periphery. Thus, the fuel assemblies 100 having larger outer lateral dimensions may be used to replace spent fuel assemblies having small outer lateral dimensions during the refueling of a nuclear reactor core.

Disposed above the nozzle 156 is an opening or plenum region 160 for the receipt of the fow of coolant or moderator and for the distribution thereof to an orifice plate 162 which evenly distributes the incoming moderator or coolant for the fuel assembly and also functions to adjust the fuel assembly pressure drop to render it approximately equal to the pressure drop of other fuel assemblies in the core into which the new fuel is being inserted. Where the tie plates 104 and 106 are designed to provide a large enough pressure drop, the orifice plate 162 may be omitted.

As alluded to above, each of fuel rods 102 comprises a cladding tube 164 and a plurality of fuel pellets 166 stacked in a column. At one end of the fuel rod 102 a fission gas plenum 168 is formed. A retaining spring 170 is provided to maintain the fuel pellets 166 in a closely stacked column and to maintain the gas plenum 168. A zirconium oxide pellet 172 or the like is used to space the retaining spring 170 from the fuel pellets 166. A crimp 171 may be formed in the cladding 164 to prevent fuel pellets from shifting downward into the fission gas plenums 168 in the event of failure of the retaining spring 170. As will be further explained below, the gas plenums 168 of alternate fuel rods 102 are preferably disposed at the bottom of the fuel bundle while the gas plenums of the intervening alternate fuel rods are disposed at the top of the fuel bundle. Such a configuration enhances the power distribution in the fuel assembly and reduces the fuel cycle costs.

The orifice plate 162 is supported in the fuel assembly by cantilever springs 174 which seat against a shoulder 176 formed in the inside circumference of the base 112. The cantilever springs 174 are preferably fastened to the orifice plate by fastening means such as rivets or bolts 178 to hold the orifice plate from moving as a result of fluid pressure against its bottom surface. The orifice plate 162 is futher provided with upstanding sidewalls 180 which generally conform to an upper portion 182 of the base 112. The sidewalls 180 terminate at a lip or flange 184 which cooperates with a shoulder 186 on the inside circumference of the upper portion 182 of the base 112. During normal operation, a space 188 is maintained between the lip 184 and the shoulder 186.

The tie plates are provided with tie plate legs 190 which are preferably formed with integral fuel bundle lifting slots 192. The bottom tie plate 106 of the fuel bundle engages the upper portion of 182 of the base 112 at a shoulder 194 which is preferably inclined to mate with a complimentary inclined surface 196 on the upper portion 182 of the base 112. The tie plate leg 190 is also preferably provided with a shoulder 198 which engages the lip 184 of the sidewalls 180. As alluded to above, the upper and lower tie plates are identical and both have similar tie plate legs 190 for engaging the base 112 in orifice plate 162. Preferably, the flat protruding surfaces 200 of the tie plate legs 190 are dimensioned to fit snugly within the flow channel 110.

As should now be apparent, the peripheral and support components of the fuel assembly, such as the flow channel 110, the base 112, and the orifice plate 162 form a relatively permanent external envelope or "can" for the fuel bundle 202 which mainly comprises the fuel rods 102, the top and bottom tie plates 104 and 106 respectively, and the spacer grids 108. The fuel bundles 202 are designed to be inserted into the "can" by means of the complimentary geometry between the base 122, orifice plate 162, and the tie plate legs 190. Since the top and bottom tie plates 104 and 106 are identical, the fuel bundle can be raised and lowered independently of the "can" by means of the fuel bundle lifting slots 192. In this manner, after the fuel assembly has been inserted into a reactor core and has been operating for a period of time, it can be raised by the lifting slots 192, inverted, and then reinserted into "can" for an additional period of time in order to achieve more complete fuel burn up. Whenever the entire fuel assembly needs to be handled, resort can be had to the fuel assembly lifting slots 144.

Thus, the present invention takes advantage of the reactivity increase achievable in a BWR core when a partially burned fuel assembly is inverted. As explained above, this increase is produced because the top of the assembly is less burned than the bottom as a result of the void distribution in a BWR which skews the power and burn up to the bottom of the core. Thus, inverting the assembly places less burned fuel at the bottom of the core where the water density is higher. This acts to increase the reactivity and consequently lower the fuel cycle costs.

Two significant design features of the present invention facilitate inverting the assembly. The first feature is that the fuel bundle is disposed in a can or external envelope and that the fuel bundle is provided with mirror symmetrical bottom and top tie plates which permit inversion of the bundle without having to move or change the bottom nozzle 112, the flow channel 110 or other related structures. The essentially identical top and bottom tie plates produce a fuel bundle 202 within the fuel assembly 100 which is the same from a mechanical and hydraulic standpoint whether it is inverted or not.

The second feature is that of placing every other fission gas plenum 168 at the bottom of the core in order to produce a fuel bundle which is axially symmetrical from the nuclear point of view. The active fuel length and position in the core of the bundle is the same whether the fuel bundle is inverted or not. In addition, placing every other fission gas plenum at the bottom increases the H/U ratio at the ends of the core. This functions to increase the reactivity because a BWR operates under an undermoderated condition especially at the top of the core. Conversely, at cold conditions the ends of the core are overmoderated. This will reduce reactivity and in some cores may permit use of fuel assemblies according the present invention without any control rod length change. Of course, for optimization reasons, fuel rod arrangements other than the alternating fission gas plenum arrangement described above may be employed.

Inversion of the fuel bundle is estimated to provide about a two or three percent fuel cycle cost benefit in BWRs. The economic benefit of disposing approximately half of the fission gas plenums at the bottom of the core is also estimated to provide a two to three percent fuel cycle cost benefit for a BWR reactor. The present invention is therefore estimated to provide a total benefit of about five percent decrease in fuel cycle cost over conventional fuel assemblies.

The present invention provides an additional advantage in that it is designed to be compatible with many other BWR fuel assemblies and can be easily integrated into a BWR core containing other fuel assembly designs during refueling operations.

The foregoing description of a preferred embodiment of the invention has been presented for purposes of illustration and description. It is not intended to be exhaustive or to limit the invention to the precise form disclosed, and obviously many modifications and variations are possible in light of the above teachings. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended herreto.

We claim:

1. A nuclear fuel assembly comprising:
   (a) a flow channel;
   (b) a lower nozzle assembly structurally attached to said flow channel to form therewith an external envelope;
   (c) an invertible fuel bundle adapted to be inserted into said envelope, said fuel bundle comprising a plurality of elongated fuel rods held in a spaced lateral array between top and bottom tie plates, each of said top and bottom tie plates being substantially identical and having means for supporting said fuel bundle within said envelope in either of two mututally inverted vertical orientations whereby the orientation of the fuel bundle in a flow channel may be reversed during burn-up operation.

2. The fuel assembly of claim 1 wherein said fuel rods comprise a tubular cladding containing nuclear fuel, each of said fuel rods having a fission gas plenum disposed within said cladding to accommodate fission gases released during operation of said fuel assembly, wherein some of said fission gas plenums are disposed adjacent said top tie plate and the remainder of said fission gas plenums are disposed adjacent said bottom tie plate.

3. The fuel assembly of claim 2 wherein fission gas plenums of alternate fuel rods are disposed adjacent said top tie plate and intervening alternate fuel rod fission gas plenums are disposed adjacent said bottom tie plate.

4. The fuel assembly of claim 1 wherein said means for supporting said fuel bundle comprise a plurality of tie plate legs extending from said top and bottom tie plates, said tie plate legs having means for engaging said lower nozzle assembly and for supporting said fuel bundle thereon.

5. The fuel assembly of claim 2 wherein said means for supporting said fuel bundle comprises a plurality of tie plate legs extending from said top and bottom tie plates, said tie plate legs having means for engaging said lower nozzle assembly and for supporting said fuel bundle.

6. The fuel assembly of claim 4 wherein said tie plate legs have lifting slots formed integrally therein.

7. The fuel assembly of claim 5 wherein said tie plate legs have lifting slots formed integrally therein.

8. The fuel assembly of claim 4 further comprising an orifice plate assembly disposed in said lower nozzle assembly and having means for engaging said tie plate legs and means for engaging said lower nozzle assembly.

9. The fuel assembly of claim 5 further comprising an orifice plate assembly disposed in said lower nozzle assembly and having means for engaging said tie plate legs and means for engaging said lower nozzle assembly.

10. The fuel assembly of claim 2 wherein each of said fuel rods further has an end plug at each end thereof, each of said end plugs having an extension extending from said cladding, said top and bottom tie plates each having a plurality of apertures therein for slidably accepting said extensions.

11. The fuel assembly of claim 2 wherein said cladding is provided with a crimp in the region of said fission gas plenums to prevent said nuclear fuel from occupying said fission gas plenums.

12. A method of operating a nuclear reactor having a core containing a fuel bundle external envelope comprising a flow channel and a bottom nozzle assembly, said method comprising the steps of:
   (a) inserting a nuclear fuel bundle having substantially identical top and bottom tie plates into said external envelope with one of said top and bottom tie plates engaging said bottom nozzle assembly to support said fuel bundle thereon;
   (b) operating said reactor for a period of time;
   (c) withdrawing said fuel bundle from said envelope;
   (d) inverting said fuel bundle;
   (e) reinserting said inverted fuel bundle into said envelope with the other of said top and bottom tie plates engaging said bottom nozzle to support said fuel assembly thereon; and
   (f) continuing to operate said reactor with said inverted fuel bundle.

13. The method of claim 12 further comprising the steps of:
   (a) providing fission gas plenums in each fuel rod of said fuel bundle;
   (b) disposing some of said fission gas plenums at the top of said fuel bundle and a remainer of said fission gas plenums at the bottom of said fuel bundle.

14. The method of claim 13 wherein the step of disposing further comprises:
   (a) orienting alternate fission gas plenums at the top of the fuel bundle; and
   (b) orienting intervening alternate fission gas plenums at the bottom of the fuel bundle.

15. A method of operating a BWR nuclear reactor having a core containing a fuel bundle envelope comprising a flow channel and bottom nozzle assembly, said method being operable to enhance burn up of nuclear fuel and to reduce fuel cycle operating costs and comprising the steps of:
   (a) inserting the self-supporting nuclear fuel bundle having substantially identical top and bottom tie plates into said fuel bundle envelope with one of said top and bottom tie plates engaging said bottom nozzle assembly to support said fuel bundle thereon;
   (b) operating said reactor for a period of time to partially burn said fuel whereby fuel positioned at the lower portion of said fuel bundle is burned to a larger extent than fuel positioned at an upper portion of said fuel bundle;
   (c) withdrawing said fuel bundle from said envelope;
   (d) inverting the top and bottom of said fuel bundle;
   (e) reinserting said inverted fuel bundle into said envelope whereby the fuel burned to a larger extent is positioned at the upper portion of the fuel bundle;
   (f) continuing to operate said reactor with said inverted fuel bundle whereby the fuel in said fuel bundle is more evenly burned.

* * * * *